United States Patent
Currier

(10) Patent No.: US 11,009,522 B2
(45) Date of Patent: May 18, 2021

(54) SYSTEMS AND METHODS FOR CALIBRATING AN ACCELERATION SENSOR USING A PAYLOAD SYSTEM

(71) Applicant: Caterpillar Inc., Deerfield, IL (US)

(72) Inventor: Shaun D. Currier, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 266 days.

(21) Appl. No.: 16/125,646

(22) Filed: Sep. 7, 2018

(65) Prior Publication Data

US 2020/0081030 A1 Mar. 12, 2020

(51) Int. Cl.
  *G01P 21/00* (2006.01)
  *G01P 15/08* (2006.01)

(52) U.S. Cl.
  CPC .......... *G01P 21/00* (2013.01); *G01P 15/0802* (2013.01)

(58) Field of Classification Search
  CPC combination set(s) only.
  See application file for complete search history.

(56) References Cited

U.S. PATENT DOCUMENTS

| | | | |
|---|---|---|---|
| 6,518,519 B1 * | 2/2003 | Crane, III | E02F 9/264 177/136 |
| 7,912,612 B2 * | 3/2011 | Janardhan | B25J 9/1638 701/50 |
| 8,099,994 B2 | 1/2012 | Stachow et al. | |
| 8,220,328 B2 | 7/2012 | Rudolf et al. | |
| 8,909,437 B2 | 12/2014 | Zhu et al. | |
| 9,217,757 B2 | 12/2015 | Hergesheimer et al. | |
| 9,938,692 B2 | 4/2018 | Shatters et al. | |
| 2016/0230367 A1 * | 8/2016 | Hendron | E02F 3/7627 |
| 2017/0184629 A1 * | 6/2017 | Pan | G01D 3/036 |
| 2017/0254049 A1 * | 9/2017 | Kean | E02F 3/3604 |
| 2017/0315006 A1 * | 11/2017 | Meid | A01B 63/11 |

FOREIGN PATENT DOCUMENTS

WO  2006/098645 A1  9/2006

OTHER PUBLICATIONS

Trimble Inc., LOADRITE L3180 SmartScale for Wheel Loaders Brochure (2017) (4 pages).

* cited by examiner

*Primary Examiner* — Jennifer E Simmons
(74) *Attorney, Agent, or Firm* — Bookoff McAndrews

(57) ABSTRACT

A method for calibrating an acceleration sensor coupled to a machine may comprise: at a first position of a linkage of the machine, obtaining a first acceleration measurement from the acceleration sensor and obtaining from an input a first force value indicative of a first force on the linkage; at a second position of the linkage of the machine, obtaining a second acceleration measurement from the acceleration sensor and obtaining from the input a second force value indicative of a second force on the linkage; determining a rotational offset calibration value of the acceleration sensor as a function of the first acceleration measurement, the first force value, the second acceleration measurement, and the second force value; and using the rotational offset calibration value to calibrate the acceleration sensor.

21 Claims, 3 Drawing Sheets

SYSTEMS AND METHODS FOR CALIBRATING AN ACCELERATION SENSOR USING A PAYLOAD SYSTEM

TECHNICAL FIELD

The present disclosure relates generally to a mobile machine and, more particularly, to systems and methods for calibrating sensors of such machines.

BACKGROUND

Industrial machinery, such as heavy equipment. Heavy equipment may have a variety of sensors coupled to them to measure a variety of parameters that are relevant to the operation of the heavy equipment. For example, the heavy equipment may utilize an inertial measurement unit ("IMU") that can include sensors such as accelerometers, gyroscopes, and magnetometers. An IMU coupled to a machine may measure properties such as acceleration and angular rate of the machine. During manufacture of the machine, an IMU or other sensor may be coupled to the machine using, for example, bolts or other mechanisms. Although the IMU and equipment may include pre-drilled holes for receiving bolts or other mechanisms aimed at producing consistent installation of IMUs across machines, IMUs installed within manufacturing tolerances may have slightly different alignments. For example, an IMU may be slightly skewed with respect to the machine. Particularly, an IMU may be misaligned about a z-axis, as a z-axis (pitch) orientation of the IMU may not be well-controlled during a manufacturing process.

Even a small skew of the IMU may affect the usefulness of measurements obtained by the IMU. In particular, the gravity vector measured by the IMU may be slightly angled from the actual direction of gravity if the IMU is misaligned. For example, if the IMU is misaligned about the z-axis, a gravity vector may be rotationally offset from the actual direction of gravity.

International Patent Publication No. WO2006098654 A1, filed by Actronic Limited and published on Sep. 21, 2006, describes a weighing device for measuring a payload of a load lifting (excavator) machine. The publication describes utilizing an accelerometer on the boom of the machine. As described in the publication, the excavator is operated on level ground and the boom is operated through at least six lifts with a known load in the bucket of the machine. Information from the accelerometer and other sensors is used to calibrate the weighing device. The publication describes calibrating a vertical vector using the vertical acceleration measured by the accelerometer, along with the forward acceleration of the accelerometer. However, the Actronic publication does not describe accounting for any offset in the installation of the accelerometer. Instead, the vertical acceleration measured by the accelerometer is used without any such calibration. The system of the present disclosure may solve one or more of the problems set forth above and/or other problems in the art. The scope of the current disclosure, however, is defined by the attached claims, and not by the ability to solve any specific problem.

SUMMARY

In one aspect, a method for calibrating an acceleration sensor coupled to a machine may comprise: at a first position of a linkage of the machine, obtaining a first acceleration measurement from the acceleration sensor and obtaining from an input a first force value indicative of a first force on the linkage; at a second position of the linkage of the machine, obtaining a second acceleration measurement from the acceleration sensor and obtaining from the input a second force value indicative of a second force on the linkage; determining a rotational offset calibration value of the acceleration sensor as a function of the first acceleration measurement, the first force value, the second acceleration measurement, and the second force value; and using the rotational offset calibration value to calibrate the acceleration sensor.

In a further aspect, a method for calibrating an acceleration sensor coupled to a machine may comprise: at a first position of a linkage of the machine, obtaining a first measurement from at least one sensor, wherein the linkage supports a load with a first fixed mass, and wherein the first measurement pertains to the mass of the load; at a second position of a linkage of the machine, obtaining a second measurement from the at least one sensor, wherein the linkage supports the load, and wherein the second measurement pertains to the mass of the load; and using the first measurement and the second measurement, determining a rotational offset value of the acceleration sensor.

In a still further aspect, a system for calibrating a machine may comprise: at least one acceleration sensor coupled to the machine a force sensor configured to measure at least one force on a linkage of the machine; and a controller configured to: at a first position of the linkage, obtain a first acceleration measurement from the acceleration sensor and obtain from the input a first value indicative of a first force on the linkage; at a second position of the linkage, obtain a second acceleration measurement from the acceleration sensor and obtain from the input a second value indicative of a second force on the linkage; determine a rotational offset value of the acceleration sensor as a function of the first acceleration measurement, the first value, the second acceleration measurement, and the second value; and use the rotational offset value to calibrate the acceleration sensor.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," and "approximately" are used to indicate a possible variation of ±10% in the stated value. Although the current disclosure is described with reference to a wheel loader, this is only exemplary. In general, the current disclosure can be applied to any type of heavy equipment/machine, such as, for example, any type of truck, loader, load-haul dump machine, carry dozer, etc. While the current disclosure references exemplary placements of sensors, such sensors may be placed in other suitable locations consistent with the present disclosure. While the current disclosure makes particular reference to measuring a gravity vector, it will be appreciated that the disclosed embodiments could also apply to other measured values, including values that are sensitive to the z-axis alignment of a sensor.

Figure 1:
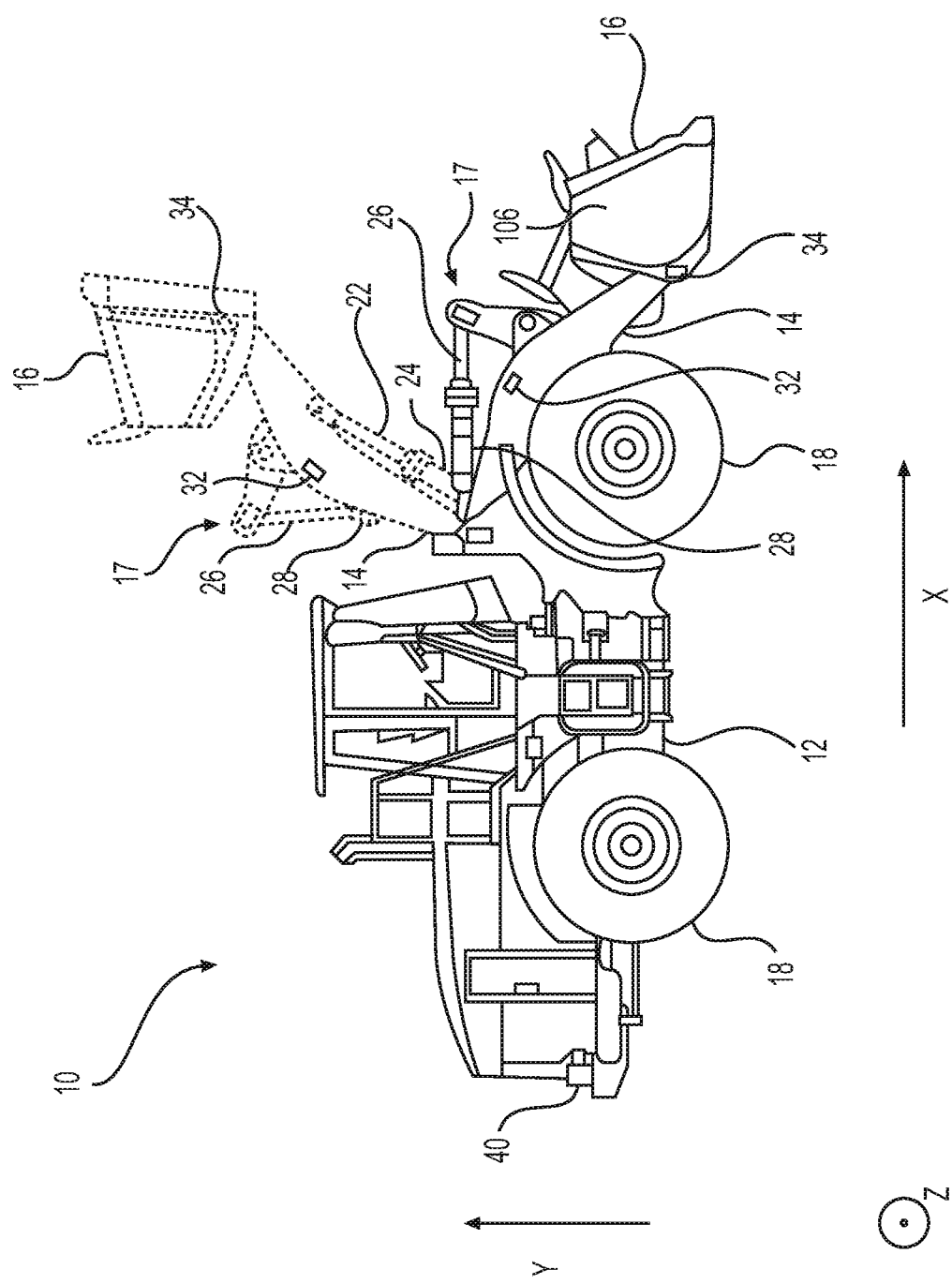
FIG. 1 is a side view of an exemplary machine in a first configuration and in a second configuration.

FIG. 1 depicts an exemplary machine 10. Although the machine depicted in FIG. 1 is a wheel loader, machine 10 may be any of the types of machines described above. A positive x-direction, as shown in FIG. 1, may be toward a front of machine 10, relative to an operator in a cab of machine 10. A positive y-direction may be toward a top of machine 10. A positive z-direction may be toward a right of machine 10, relative to an operator in a cab of machine 10 (out of the page, as shown in FIG. 1). Machine 10 may include a machine body 12, which may include components such as an operator station, an engine housing, and an engine. Machine 10 may also include an arm 14 or another moving component. A bucket 16 may be coupled to an end of arm 14. Bucket 16 may also be a different work implement, such as a fork, grapple, etc.; a bucket is merely exemplary. Moving components of machine 10 may comprise a linkage 17. Linkage 17 may have two degrees of freedom. Machine 10 may include ground surface engaging devices, such as wheels 18, that support machine 10. Although a wheeled machine is shown and described, one skilled in the art will appreciate that other machines, including track-type machines, may also be utilized. FIG. 1 shows machine 10 with a first, lowered configuration (solid lines) of linkage 17 and with a second, raised configuration (dashed lines) of linkage 17.

In the example of machine 10 being a wheel loader, lift of bucket 16 and/or linkage 17 may be powered and controlled by a lift actuator 22. Lift actuator 22 may include, for example, a hydraulic fluid cylinder actuator or any other type of actuator, as would be apparent to one skilled in the art. One or more lift pressure sensors 24 may be configured to measure forces within the cylinder end of lift actuator 22, or on another component of lift actuator 22, and may be force sensors. Tilt of bucket 16 may be powered and controlled by a tilt actuator 26. Tilt actuator 26 may include, for example, a hydraulic fluid cylinder actuator or any other type of actuator, as would be apparent to one skilled in the art. One or more tilt pressure sensors 28 may be configured to measure forces within the cylinder end of tilt actuator 26, or on another component of tilt actuator 26, and may be force sensors. For example, lift pressure sensors 24 and tilt pressure sensors 28 may be disposed in/on a head end of cylinders of lift actuator 22 and tilt actuator 26, respectively. Alternatively, lift pressure sensors 24 and tilt pressure sensors 28 may be disposed in other locations relative to an actuator, such as within a hydraulic circuit associated with an actuator. Force or pressure information may also be derived from other sources, including other sensors.

Forces acting on a lift and/or tilt cylinder 22, 26 may include a head-end pressure and/or a rod-end pressure on each side of a piston of the actuator. Lift pressure sensors 24 and tilt pressure sensors 28 may be configured to measure one or both of head-end and rod-end pressure of the lift and tilt cylinders, respectively. Alternatively, lift pressure sensors 24 and tilt pressure sensors 28 may be configured to measure a net force acting on a lift or tilt cylinder, respectively. Lift pressure sensors 24 and tilt pressure sensors 28 may detect pressure of fluid within their respective actuator.

Arm 14 may include an arm position sensor 32. Arm position sensor 32 may gather data indicative of a position of arm 14, including for example, an angle, a height or an extension of arm 14. Bucket 16 may include a bucket position sensor 34. Bucket position sensor 34 may gather data indicative of a position of bucket 16, including, for example, a height, lateral location, and/or tilt of bucket 16. Bucket position sensor 34 may be sensed directly or indirectly. For example, bucket position sensor 34 may include one or more sensors (such as rotational sensors) positioned on a portion of linkage 17 and may measure a position of bucket 16 indirectly. For example, bucket position sensor 34 may provide information about an extension length of a linkage actuator, an angle between members of linkage 17, and/or a tip of bucket 16 with respect to a ground surface or another reference datum. Arm position sensor 32 and/or bucket position sensor 34 may provide information pertaining to a linear displacement of a cylinder of tilt actuator 26 and/or an angular displacement of arm 14. Arm position sensor 32 and bucket position sensor 34 may include rotary-style sensors, magnetic pick-up type sensors, magnetostrictive-type sensors associated with a wave guide, cable-type sensors associated with cables, internally- or externally-mounted optical sensors, LIDAR, RADAR, SONAR, camera-type sensors, or any other type of height-detection/position-detection sensors known in the art. Arm position sensor 32 and bucket position sensor 34 may also include information from other sources.

An inertial motion unit ("IMU") 40 may also be coupled to machine 10. As shown in FIG. 1, IMU 40 may be coupled to a rear portion of machine 10, opposite from linkage 17. IMU 40 may transmit an acceleration and/or angular rate signal. Alternatively, IMU 40 may be mounted in any other suitable position on machine 10. IMU 40 may be positioned on any suitable surface of machine 10. For example, IMU 40 may be located on a bottom surface of machine 10, on a front or rear surface of machine 10, or on a top surface of machine 10. IMU 40 may be enclosed in a housing of machine 10 or may be on an exterior surface of machine 10.

IMU 40 may be mounted or otherwise coupled to machine 10 so that a plane fixed in the coordinate system of IMU 40 is substantially parallel to an X-Y plane of machine 10. As a note, a front frame and a rear frame of machine 10 (such as, e.g., where machine 10 is a wheel loader) may be offset from one another by a steering angle or an articulation angle. Angles measured with respect to an IMU on a rear portion of machine 10 may have to be transformed so as to apply to a front frame of machine 10. Such a transformation would be within the skill of a person having skill in the art. IMU 40 may have a mounting location on machine 10 such that measurements may be transformed to an equivalent representation in the coordinate system of linkage 17. For example, such a transformation may be achieved by a rotation matrix representing the angle between the rear frame of machine 10 and linkage 17. IMU 40 may be coupled to machine 10 using any suitable mechanism, such as bolts or other coupling mechanisms. IMU 40 and/or machine 10 may be configured to facilitate placement of IMU 40 on machine 10. However, manufacturing tolerances may result in skewing or misorientation of IMU 40 with respect to machine 10. Error in parallelism of the plane of IMU 40 with respect to the X-Y plane of linkage 17 may not significantly affect systems utilizing the measurements of IMU 40. Thus, it may be assumed that IMU 40 is sufficiently parallel to the X-Y plane of linkage 17 so that any error in parallelism and its associated measurement error is negligible to systems that utilize the IMU 40 measurements. However, angular misorientation about the Z-axis may result in unacceptable errors in the IMU measurements and require compensation and/or calibration, as described below, for example.

IMU 40 may be any suitable type of conventional inertial sensor and may be or may include an acceleration sensor, angular rate sensor, slope, and/or magnetic field sensor. For example, IMU 40 may be an electronic device that measures and reports information about machine 10, including, for example, acceleration (such as a proper acceleration), angular rate, slope, and/or magnetic field. IMU 40 may include, for example, one or more accelerometers, one or more gyroscopes, and/or one or more magnetometers. IMU 40 may be configured to measure a specific acceleration of machine 10. For example, IMU 40 may be configured to provide a gravity vector, proper acceleration vector, angular rate vector, slope vector, and/or magnetic field vector. However, when an IMU 40 is not calibrated for the particular placement of IMU 40 on machine 10, any vectors measured may not accurately align with the actual physical vector. In particular, such discrepancies may arise when IMU 40 is misaligned with respect to a z-axis.

Figure 2:
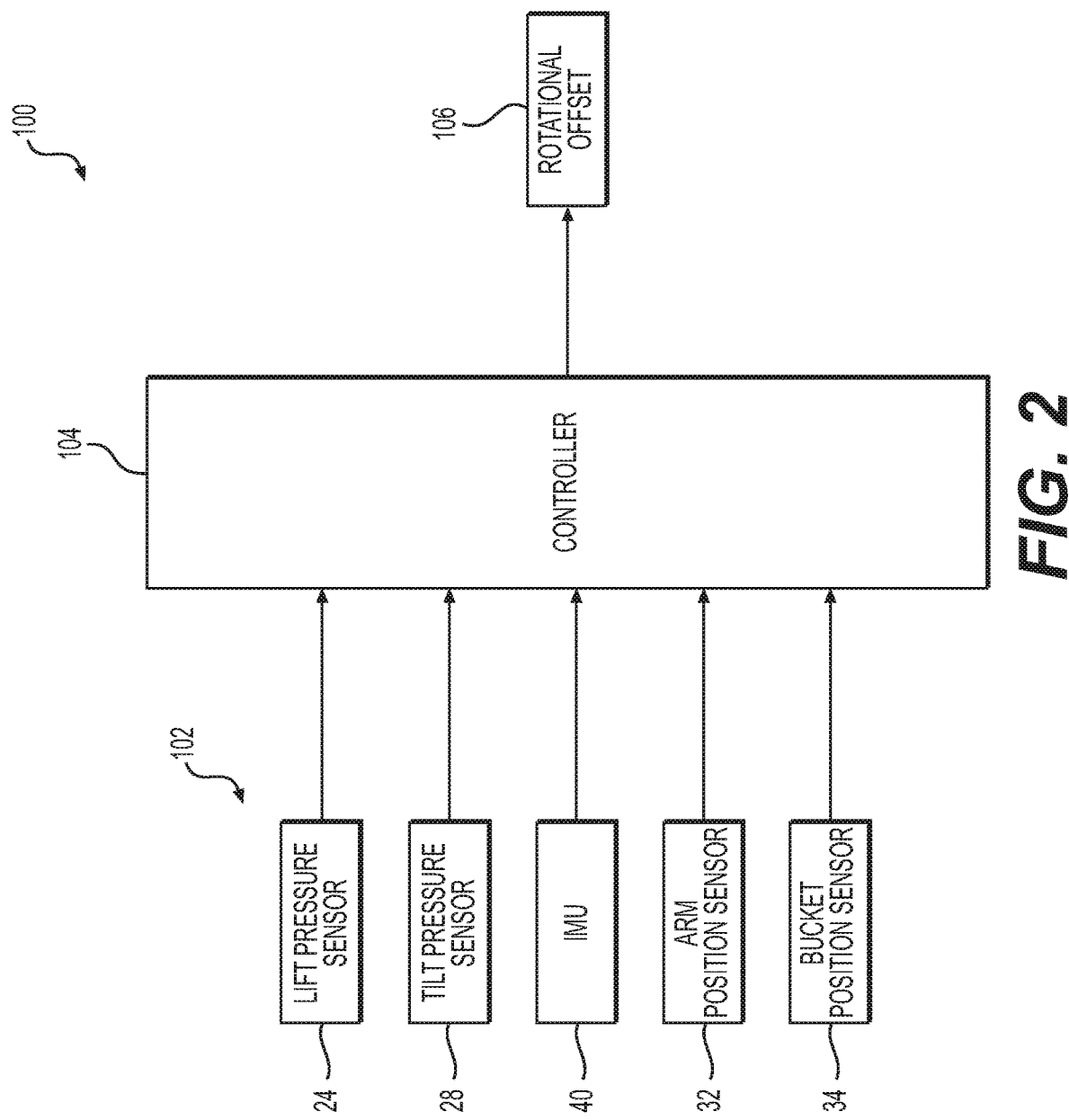
FIG. 2 is a block diagram of an exemplary control system for the machine of FIG. 1.

FIG. 2 illustrates an exemplary calibration system 100 that may be utilized along with machine 10. System 100 may include one or more inputs 102, a controller 104, and a rotational offset output 106. Lift pressure sensor 24 may provide values such as lift head-end pressure and lift rod-end pressure. Lift pressure sensor 24 is depicted with one reference for convenience in the figures herein but may actually include two sensors—one attached to a head-end and one attached to a rod-end. Tilt pressure sensor 28 may provide values such as tilt head-end pressure and tilt rod-end pressure. Tilt pressure sensor 28 is depicted with one reference for convenience in the figures herein but may actually include two sensors—one attached to a head-end and one attached to a rod-end. IMU 40 may provide a raw output vector prior to calibration (as performed by process 200, described in detail below). The raw output vector may be a raw gravity and/or proper acceleration vector relative to the local coordinate system of IMU 40, as described above. A vector provided by IMU 40 may include x-, y-, and z-directional components. Arm position sensor 32 and/or bucket position sensor 34 may provide data such as a linear displacement of a cylinder of tilt actuator 26 and/or an angular displacement of arm 14.

Controller 104 may embody a single microprocessor or multiple microprocessors that may include hardware and software for monitoring operations of machine 10 and issuing instructions to components of machine 10. For example, controller 104 may include a memory, a secondary storage device, a clock, and a processor, such as a central processing unit or any other means for accomplishing a task consistent with the present disclosure. The memory or secondary storage device associated with controller 104 may store data and/or software routines that may assist controller 104 in performing its functions. Further, the memory or storage device associated with controller 104 may also store data received from the various inputs 102 associated with machine 10. Numerous commercially available microprocessors can be configured to perform the functions of controller 104. It should be appreciated that controller 104 could readily embody a general machine controller capable of controlling numerous other machine functions. Various other known circuits may be associated with controller 104, including signal-conditioning circuitry, communication circuitry, hydraulic or other actuation circuitry, and other appropriate circuitry. Controller 104 may be programmed with a variety of properties of machine 10, including, e.g., masses and dimensions of components of linkage 17.

Rotational offset output 106 may be indicative of an amount by which IMU 40 is offset from a planned or ideal position of IMU 40. Additionally or alternatively, rotational offset 106 may be reflective of an amount by which a vector measured by IMU 40 (e.g., a proper acceleration or gravity vector) is offset from an actual gravity vector caused by a force of gravity. Rotational offset 106 may be used to calibrate IMU 40 and may be considered during future calculations involving outputs from IMU 40. For example, rotational offset 106 may be considered when a payload carried by machine 10 is sensed while machine 10 is in use.

Figure 3:
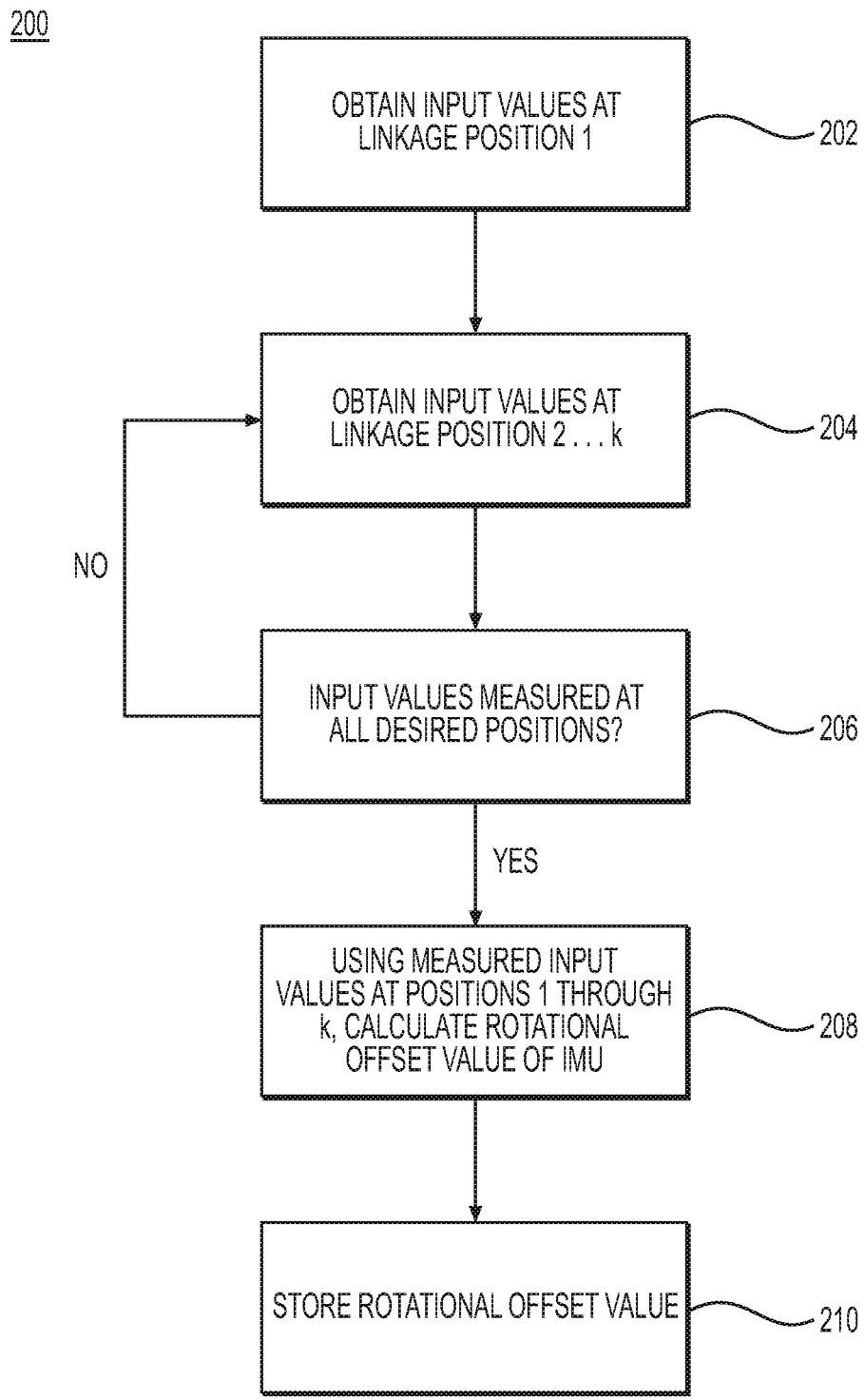
FIG. 3 is a flow diagram showing an exemplary control sequence for determining a rotational offset of a sensor of the machine of FIG. 1 using the exemplary control system of FIG. 2.

FIG. 3 is a flow chart depicting an exemplary process 200 for operating calibration system 100. Prior to beginning process 200, bucket 16 may be loaded with a load that remains constant during the completion of process 200. A load placed in bucket 16 is not required to be a known mass. The load placed in bucket 16 may be a load having a known or an unknown mass. As described below, calibration process 200 involves moving linkage 17 (and bucket 16) to different positions. If the payload of bucket 16 were measured using a raw gravity vector from IMU 40, without calibration, the constant payload may be measured to be different payloads at different positions of linkage 17. However, since a constant load is in bucket 16, such measured payloads should be the same. Discrepancies in payload measurements may be due to small differences between the raw gravity vector measured by IMU 40 and the actual gravity vector. Calibration process 200 makes use of these differences to determine the rotational offset of IMU 40 for the purpose of correcting its measurements. It should be noted that although a gravity vector measured from IMU 40 may be used in the calibration, the resulting calibration can correct subsequent measurements that IMU 40 may perform.

In step 202, values from inputs 102 may be obtained at a first position of linkage 17. The first position of linkage 17 may be a pre-determined position at a specified height and/or tilt of bucket 16. Alternatively, the first position of linkage 17 may not be pre-determined and may be measured using, for example, arm position sensor 32 and/or bucket position sensor 34. Even where a position of linkage 17 is predetermined, arm position sensor and/or bucket position sensor 34 may be used in determining a position of linkage 17. A calculation of payload carried by bucket 16 may be a function of an actual gravity vector g (particularly the components of gravity in the x- and y-directions, $g_x$ and $g_y$), known values, and data from one or more of inputs 102. The function may incorporate known, fixed values, such as machine and linkage properties, which may be stored on, for example, controller 104. A gravity vector may be a function of a raw IMU sensor output vector, rotated by rotational offset 106. For example, the below equations may apply:

$$m_{payload} = f_{payload}(g_x, g_y, F_{tilt}, F_{lift}, d_{tilt}, \theta_{arm}, m_{tool}, d_{tool})$$

$$g = R_z(\theta_{cal})s$$

In the above equations, $m_{payload}$ may be a mass of a payload; $f_{payload}$ may be a payload function applied for the particular linkage 17 of machine 10 and may be an equation or method of calculation known in the art and/or derived with the assistance of a computational algebra system; $F_{tilt}$ may be the force of tilt cylinders of tilt actuator 26, as measured by tilt sensors 28. $F_{tilt}$ may be a force of lift cylinders of lift actuator 22, as measured by lift sensors 24; $d_{tilt}$ may be a linear displacement of a cylinder of tilt actuator 26, as measured or calculated from sensors such as arm position sensor 32, bucket position sensor 34, and/or other inputs 102; $\theta_{arm}$ may be an angular displacement of arm 14, as measured by sensors such as arm position sensor 32, and/or other inputs 102; $m_{tool}$ may be a mass (e.g., a known mass) of a tool such as bucket 16; $d_{tool}$ may be a known distance between two linkage pin attachment points on a tool such as bucket 16; g may be an actual gravity vector, relative to the coordinate system of machine 10, comprising components $g_x$, $g_y$, and $g_z$; $R_z(\theta)$ may be a rotation matrix applying a rotation of $\theta_{cal}$ about the z-axis of machine 10 (which, by assumed parallelism of IMU 40 and machine 10 X-Y planes explained above, is parallel to the z-axis of IMU 40); $\theta_{cal}$ may be a rotational offset calibration value; and s may be a raw output vector from IMU 40, relative to the local coordinate system of the IMU, and may comprise coordinates $s_x$, $s_y$, and $s_z$.

As explained above, calibration value $\theta_{cal}$ may be applied as a rotation about the z-axis of machine 10/IMU 40 using the rotation matrix $R_z$ on sensor vector s, as shown in the equation below, resulting in the corrected gravity vector g which represents actual gravity:

$$R_z(\theta_{cal})s = \begin{bmatrix} s_x\cos\theta_{cal} - s_y\sin\theta_{cal} \\ s_x\sin\theta_{cal} + s_y\cos\theta_{cal} \\ s_z \end{bmatrix} = g = \begin{bmatrix} g_x \\ g_y \\ g_z \end{bmatrix}$$

The above equations may be combined via substitution for $g_x$ and $g_y$:

$$m_{payload} = f_{payload}\begin{pmatrix} s_x\cos\theta_{cal} - s_y\sin\theta_{cal}, s_x\sin\theta_{cal} + s_y\cos\theta_{cal}, \\ F_{tilt}, F_{lift}, d_{tilt}, \theta_{arm}, m_{tool}, d_{tool} \end{pmatrix}$$

Even when a linkage 17 is moved to other positions in subsequent steps of process 200, the actual payload will remain constant, because the bucket will carry the same load. A significant difference in a measured payload would be due to a misalignment of IMU 40, which can be corrected with the rotational offset ($\theta_{cal}$) 106 in the equation above. Furthermore, rotational offset ($\theta_{cal}$) 106 will also remain the same because it is a consequence of the mounting position of IMU 40, which does not change with positions of linkage 17. Thus, the payload at the first position (the position of linkage 17 in step 202) may be calculated by the following equation:

$$m_{payload,1} = f_{payload}\begin{pmatrix} s_{x,1}\cos\theta_{cal} - s_{y,1}\sin\theta_{cal}, s_{x,1}\sin\theta_{cal} + s_{y,1}\cos\theta_{cal}, \\ F_{tilt,1}, F_{lift,1}, d_{tilt,1}, \theta_{arm,1}, m_{tool}, d_{tool} \end{pmatrix}$$

In step 204, bucket 16 may be moved to a second position. For example, lift actuator 22 may be activated so as to raise or lower linkage 17 and/or tilt actuator 26 may change a tilt of bucket 16. As in step 202, the second position of linkage 17 may be predetermined and/or may be determined using sensors such as arm position sensor 32 and/or bucket position sensor 34. Data from inputs 102 may be obtained, as in step 202. The same equations for payload and gravity vector as described with regard to step 202 may apply in step 204, substituting in values measured at position two, as shown below. A payload at the second position may thus be calculated using the following equation:

$$m_{payload,2} = f_{payload}\begin{pmatrix} s_{x,2}\cos\theta_{cal} - s_{y,2}\sin\theta_{cal}, s_{x,2}\sin\theta_{cal} + s_{y,2}\cos\theta_{cal}, \\ F_{tilt,2}, F_{lift,2}, d_{tilt,2}, \theta_{arm,2}, m_{tool}, d_{tool} \end{pmatrix}$$

Only two linkage positions are mathematically required for the above equation for calculating the rotational offset 106. In practice, however, information from more positions may be used. For example, to reject noise present in measurements, the information from extra positions may be used to over-determine the system of equations and resolved with fitting techniques to select a single "best" rotational offset 106. These techniques are well-known to those skilled in the art. The number of positions at which measurements are taken may depend on the degree of precision desired, the signal noise involved, etc. If further measurements are desired, step 204 may be repeated until all desired measurements are obtained. A payload at a kth position may be calculated using the following equation:

$$m_{payload,2} = f_{payload}\begin{pmatrix} s_{x,k}\cos\theta_{cal} - s_{y,k}\sin\theta_{cal}, s_{x,k}\sin\theta_{cal} + s_{y,k}\cos\theta_{cal}, \\ F_{tilt,k}, F_{lift,k}, d_{tilt,k}, \theta_{arm,k}, m_{tool}, d_{tool} \end{pmatrix}$$

After the sensor values have been measured at all desired positions, as determined in step 206, rotational offset 106 may be calculated. As described above, the payload is the same at all of the positions of linkage 17, because the loading of the bucket was not changed. Thus, the payload equations above for positions 1 through k may all be equalized:

$$f_{payload}\begin{pmatrix} s_{x,1}\cos\theta_{cal} - s_{y,1}\sin\theta_{cal}, s_{x,1}\sin\theta_{cal} + s_{y,1}\cos\theta_{cal}, \\ F_{tilt,1}, F_{lift,1}, d_{tilt,1}, \theta_{arm,1}, m_{tool}, d_{tool} \end{pmatrix} =$$

$$f_{payload}\begin{pmatrix} s_{x,2}\cos\theta_{cal} - s_{y,2}\sin\theta_{cal}, s_{x,2}\sin\theta_{cal} + s_{y,2}\cos\theta_{cal}, \\ F_{tilt,2}, F_{lift,2}, d_{tilt,2}, \theta_{arm,2}, m_{tool}, d_{tool} \end{pmatrix} \ldots =$$

$$f_{payload}\begin{pmatrix} s_{x,k}\cos\theta_{cal} - s_{y,k}\sin\theta_{cal}, s_{x,k}\sin\theta_{cal} + s_{y,k}\cos\theta_{cal}, \\ F_{tilt,k}, F_{lift,k}, d_{tilt,k}, \theta_{arm,k}, m_{tool}, d_{tool} \end{pmatrix}$$

If only two positions are used, the system has one equation and one unknown. The unknown is the rotational offset ($\theta_{cal}$) 106. Thus, using the equations above, rotational offset 106 may be solved for using only two positions of linkage 17 (e.g., the first and second positions, as described above and shown in the equations above with subscripts 1 and 2). In practice, noise in measurements of inputs 102 and/or noise in other sensor measurements may warrant use of techniques such as regression, fitting, etc., to solve for rotational offset 106. In such cases, more than two positions of linkage 17 may be used to determine rotational offset ($\theta_{cal}$) 106. Such techniques would be within the knowledge of one skilled in the art. Furthermore, techniques may be used to reduce the effects of friction, such as by measuring data from inputs 102 during lifting and lowering of linkage 17.

In step 210, rotational offset calibration value 106 may be stored. Subsequently, when machine 10 is engaged in productive work, controller 104 or another component of machine 10 may use the equation for gravity provided above and reproduced below, for convenience, in order to generate a live gravity vector:

$$g = R_z(\theta_{cal})s$$

The rotational offset calibration value ($\theta_{cal}$) may thus be used along with a raw IMU sensor output vector (s) to determine a gravity vector (g). Gravity vector g as calculated using this method will be free from effects of misorientation of IMU 40 in the direction of the z-axis. As discussed above, any of the above steps may also incorporate a transformation between a rear frame and a front frame of machine 10, to account for a steering or articulation angle. Such a transformation would be within the skill of a person in the art.

The benefits of orientation correction also extend to other vector outputs of the sensor. In particular, the disclosed embodiments could apply to other systems that are sensitive to misalignments in the z-axis. For example, the disclosed embodiments could be used to improve up on measurements of a slope at which a machine 10 is oriented (e.g., a slope of the ground upon which machine 10 rests). For example, retarding systems may provide speed control of a machine throughout a range of slope conditions. The disclosed embodiments could be used to further refine such a system.

INDUSTRIAL APPLICABILITY

The disclosed aspects of the system 100 and method 200 described herein may be used during operation of a machine 10 in a variety of settings. For example, it may be helpful to obtain an accurate gravity vector (g) to measure a payload of a linkage 17 and/or bucket 16. System 100 and method 200 account for potential alignment issues with IMU 40 with respect to machine 10, particularly rotations about z-axis. Misalignments of IMU 40 may have substantial effects on a gravity vector as determined by IMU 40 prior to calibration. Because an orientation of IMU 40 with respect to machine 10 may be constant over time, method 200 may only need to be performed once or may be performed infrequently. In the case of replacement or alteration of IMU 40, method 200 may be repeated to re-calibrate system 100.

System 100 and method 200 may be especially useful for providing accurate payload data when machine 10 is used on different ground surfaces having a variety of pitches, as methods of payload measuring that do not utilize a gravity vector from an IMU may be sensitive to changes in pitch of machine 10, as opposed to when machine 10 was calibrated.

It will be apparent to those skilled in the art that various modifications and variations can be made to the disclosed system without departing from the scope of the disclosure. Other embodiments of the system will be apparent to those skilled in the art from consideration of the specification and practice of the machine disclosed herein. It is intended that the specification and examples be considered as exemplary only, with a true scope of the disclosure being indicated by the following claims and their equivalents.

What is claimed is:

1. A method for calibrating an acceleration sensor coupled to a machine, the method comprising:
   at a first position of a linkage of the machine, obtaining a first acceleration measurement from the acceleration sensor and obtaining from an input a first force value indicative of a first force on the linkage;
   at a second position of the linkage of the machine, obtaining a second acceleration measurement from the acceleration sensor and obtaining from the input a second force value indicative of a second force on the linkage;
   determining a rotational offset calibration value of the acceleration sensor as a function of the first acceleration measurement, the first force value, the second acceleration measurement, and the second force value; and
   using the rotational offset calibration value to calibrate the acceleration sensor.

2. The method of claim 1, wherein the input is a first input, and wherein the method further comprises:
   obtaining from a second input a first position value indicative of a first position of the linkage; and
   obtaining from the second input a second position value indicative of a second position of the linkage; and
   wherein determination of the rotational offset value is also a function of the first position value and the second position value.

3. The method of claim 2, wherein at least one of the first position value and second position value is obtained from at least one rotational sensor.

4. The method of claim 1, wherein the machine includes a tool, and wherein the tool carries the same payload at the first and the second position.

5. The method of claim 1, wherein the acceleration sensor is an inertial measurement unit.

6. The method of claim 1, wherein the first and the second force values are obtained from one or more pressure sensors.

7. The method of claim 1, wherein the first and the second acceleration measurements pertain to a gravity vector measured by the acceleration sensor.

8. The method of claim 1, wherein the rotational offset value reflects an amount by which the acceleration sensor is offset from a z-axis of the machine.

9. The method of claim 1, wherein the determination of the rotational offset value is also a function of one or more of a mass of a tool of the machine or a distance between two points on the tool.

10. The method of claim 1, wherein the determination of the rotational offset value is also a function of one or more of a linear displacement of an actuator of the machine or an angular displacement of a linkage component of the machine.

11. A method for calibrating an acceleration sensor coupled to a machine, the method comprising:
    at a first position of a linkage of the machine, obtaining a first measurement from at least one sensor, wherein the linkage supports a load with a fixed mass, and wherein the first measurement pertains to the mass of the load;
    at a second position of a linkage of the machine, obtaining a second measurement from the at least one sensor, wherein the linkage supports the load, and wherein the second measurement pertains to the mass of the load; and
    using the first measurement and the second measurement, determining a rotational offset value of the acceleration sensor.

12. The method of claim 11, wherein the mass of the load is unknown.

13. The method of claim 11, wherein the acceleration sensor is an inertial measurement unit.

14. The method of claim 11, wherein the at least one sensor includes at least one of a pressure sensor or an inertial measurement unit.

15. The method of claim 11, wherein the rotational offset value reflects an amount by which the acceleration sensor is offset from a z-axis of the machine.

16. The method of claim 11, further comprising using one or more of a mass of a tool of the machine, a distance between two points on the tool, a linear displacement of an actuator of the machine, or an angular displacement of a linkage component of the machine to determine the rotational offset value.

17. A system for calibrating a machine, the system comprising:
   at least one acceleration sensor coupled to the machine;
   a force sensor configured to measure at least one force on a linkage of the machine; and
   a controller configured to:
      at a first position of the linkage, obtain a first acceleration measurement from the acceleration sensor and obtain from the force sensor a first value indicative of a first force on the linkage;
      at a second position of the linkage, obtain a second acceleration measurement from the acceleration sensor and obtain from the force sensor a second value indicative of a second force on the linkage;
      determine a rotational offset value of the acceleration sensor as a function of the first acceleration measurement, the first value, the second acceleration measurement, and the second value; and
      use the rotational offset value to calibrate the acceleration sensor.

18. The system of claim 17, wherein the acceleration sensor is an inertial measurement unit.

19. The system of claim 17, wherein the first and the second acceleration measurements pertain to a gravity vector measured by the acceleration sensor.

20. The system of claim 17, wherein the acceleration sensor is coupled to a rear portion of a wheel loader.

21. The system of claim 17 wherein the force sensor is a pressure sensor.

* * * * *